United States Patent
Klassen

[15] 3,672,393
[45] June 27, 1972

[54] HYDRANT VALVE ASSEMBLY

[72] Inventor: Hans Klassen, Zedernstr. 7, 4048 Grevenbroich, Germany

[22] Filed: Jan. 23, 1970

[21] Appl. No.: 5,434

[52] U.S. Cl. .............................. 137/307, 137/551, 137/609, 137/628
[51] Int. Cl. ................... E03b 9/08, F16k 31/50, F16k 37/00
[58] Field of Search .............................. 137/272, 282–285, 137/294–307, 551, 553, 609, 625.49, 614.15, 628; 251/117

[56] References Cited

UNITED STATES PATENTS

R16,168  9/1925  Charland .............................. 137/272

FOREIGN PATENTS OR APPLICATIONS 351,421  4/1922  Germany ............................... 137/609
457,360  3/1928  Germany ............................... 137/272
645,505  5/1937  Germany ............................... 137/307

Primary Examiner—M. Cary Nelson
Assistant Examiner—Richard Gerard
Attorney—Burgess, Dinklage & Sprung

[57] ABSTRACT

A gate valve, particularly the gate valve of a hydrant including a shut-off valve cooperating with the gate valve, is provided with a bleed passageway so that with the gate valve in the closed position, a small stream will flow from the upstream side of the valve into the valve housing, indicating, when the housing is open, that the gate valve is closed.

3 Claims, 2 Drawing Figures

PATENTED JUN 27 1972 3,672,393
FIG. 1.
FIG. 2.
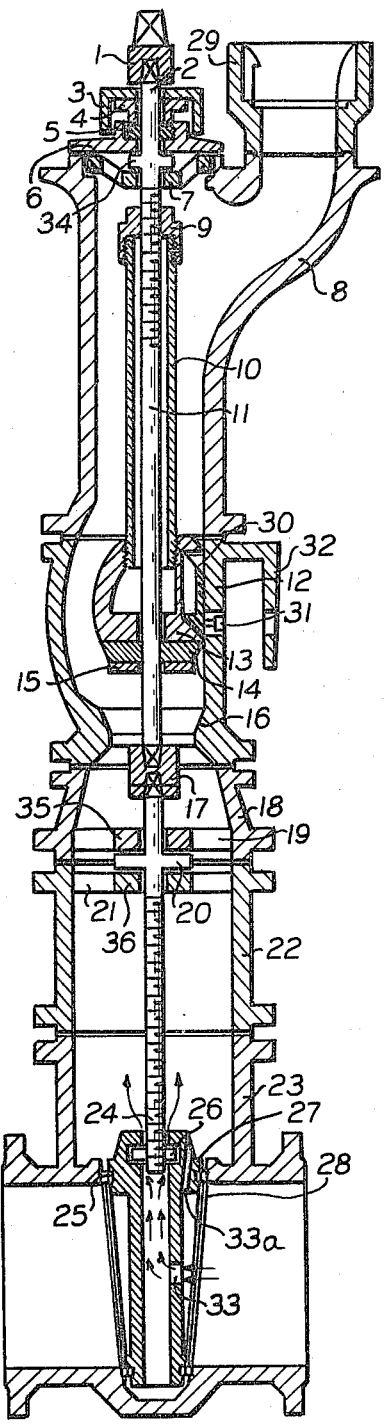
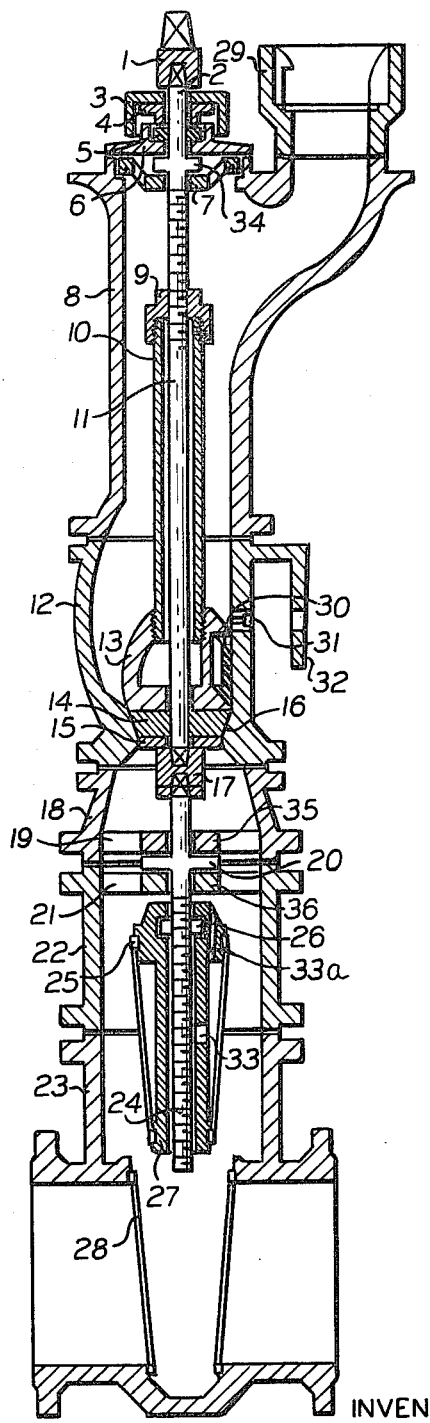
INVENTOR
HANS KLASSEN
BY
Burgess, Dinklage & Sprung
ATTORNEYS.

HYDRANT VALVE ASSEMBLY

BACKGROUND

The invention relates to a hydrant having a spindle-operated wedge gate valve in the main pipe line and a shut-off valve disposed above same in the casing of the hydrant.

Hydrants of this kind are known in which a wedge-gate valve that can be operated by means of a spindle is disposed in the pipe line in which the valve is installed, the upper part of the said wedge-gate valve being constructed as a shut-off valve whose seat is disposed above the main line in the hydrant casing. See German Pat. No. 64,606. The shut-off valve is thus closed when the wedge-gate valve is completely open. Therefore, when the wedge-gate valve is open, it prevents water from passing upward out of the hydrant. The system, however, has the disadvantage that repairs can be made on the shut-off valve only when the main line is shut off at another point by means of another valve.

On the other hand, it is in the prior art (German Pat. No. 457,360) to provide for a releasable connection between the wedge-gate valve and shut-off valve. Therefore, it is possible in this arrangement to remove the shut-off valve from the hydrant while the wedge-gate valve is closing the main line. The arrangement has the disadvantage, however, that there is no way of knowing with certainty whether the wedge-gate valve is closed or open.

According to the system first mentioned, an indicating means consisting of gears must be provided on top of the hydrant for this purpose. Such apparatus, however, is relatively complicated and troublesome.

THE INVENTION

It is the purpose of the invention to design a hydrant having a spindle-operated wedge-gate valve in the main line and a shut-off valve disposed above same in the hydrant housing, the said valves being operable by means of the same spindle in such a manner that, when the wedge gate valve is closed the shut-off valve is open, and when the wedge-gate valve is fully open the shut-off valve is closed, all in such a manner that the one who is operating the hydrant can easily and with certainty whether the wedge-gate valve is closed.

According to the invention, this is accomplished by the fact that the spindle consists of two parts having opposite threads, which are releasably joined together by a coupling, the one part serving for the operation of the wedge-gate valve and the other part serving for the operation of the shut-off valve, and the wedge gate being provided with a hole by which the interior of the main pipe line is connected to the interior of the hydrant casing through a cross section that is very small in comparison with the cross section of the main pipe line.

In this arrangement it is easily possible to dismantle the shut-off valve while the wedge-gate valve is closed. When the wedge-gate valve is all the way open, the shut-off valve is in the closed position, so that the water can flow unhampered through the main line, but is unable to penetrate into the upper part of the hydrant casing. When the wedge-gate valve is closed, the shut-off valve is necessarily opened. Some water then passes from the main line through the hole in the wedge-gate valve and into the casing of the hydrant. This water indicates that the wedge-gate valve is closed and that there is water in the main line.

Preferably, the hydrant is so constructed that the portion of the spindle that operates the wedge-gate valve has a flange that engages into an annular groove formed by holding means which are disposed on portions of the hydrant casing that can be separated from one another.

Thus, the invention provides an improvement in a gate valve comprising a valve body for installation of the valve in a main line, and having a valve seat, and further comprising a gate for opening and closing the valve by respectively engaging and disengaging the gate with the valve seat. Further, the valve includes a spindle means for selectively lowering and raising the gate to respectively close and open the valve, and a gate housing disposed above the valve body for receiving the gate when the gate is in the raised position. The housing is sealed from the valve body portion when the gate is in the closed position. The invention provides the improvement which comprises a bleed passageway in the gate for communicating one side of the gate with the gate housing with the gate in the closed position. Thereby, with the valve installed in a main line with the bleed passageway communicating with the upstream side of the valve, when the valve is in the closed position, a small stream will continuously flow into the gate housing indicating that the gate is in the closed position.

The invention includes a hydrant comprising a gate valve as just described, for installation in the main line. The hydrant further includes a hydrant housing releasably mounted atop the gate housing, a hydrant shut-off valve disposed in the hydrant housing, and a shut-off valve spindle means for opening and closing the shut-off valve. The shut-off valve spindle means and gate valve spindle means are operatively connected to form a single hydrant spindle means. The hydrant spindle means operates to simultaneously close the gate valve and open the shut-off valve, and simultaneously open the gate valve and close the shut-off valve.

Desirably, the connection between the gate valve spindle means and the shut-off valve spindle means is a releasable connection permitting disassembly of the shut-off valve and gate valve with the gate valve installed in the main line.

Further, desirably, the hydrant housing comprises a lower member mounted on the gate valve housing, an intermediate member mounted on said lower member, and an upper member releasably mounted on the intermediate member. The shut-off valve plug is disposed in the shut-off valve housing upper member. The gate valve spindle means has a collar intermediate the gate and the releasable connection joining the gate valve and shut-off valve spindle means, and retaining means are provided for securing the collar and gate valve spindle means at a fixed elevation. The retaining means includes a lower member secured to the hydrant housing lower member and an upper member secured to the hydrant housing intermediate member. The lower and upper retaining means members cooperate together to effect the securing of the gate valve spindle means at a fixed elevation. Thereby, with the gate valve in the closed position and the upper member of the hydrant housing removed and the gate valve spindle means and shut-off valve spindle means disconnected, the gate valve can be secured in the closed position.

The described mounting of the gate valve and shut-off valve on the spindle composed of the gate valve and shut-off valve spindles, can be by providing the respective spindle parts with opposite threads. For example, the spindle part carrying the gate can have right hand threads, while the spindle part carrying the plug of the shut-off valve can have left hand threads.

EMBODIMENTS

The drawings show an embodiment of the invention.

FIG. 1 shows the system when the wedge-gate valve is closed; and

FIG. 2 when it is completely open.

Both figures show a longitudinal cross section through a hydrant according to the invention.

The example shown is an underground hydrant which consists of a casing 8 through which a spindle 11 passes which is mounted in a stuffing box consisting of a nut 3, follower 4, packing 5 and base 6. At the upper end the spindle 11 has a square drive 2 covered by a guard 1. A flange 34 on spindle 11 is rotatably held between the stuffing base 6 and a spindle-supporting spider 7.

On the spindle 11 there is placed a traveling nut 9 which is non-rotatably affixed to a spindle sleeve 10 which in turn is non-rotatably affixed to the shut-off valve 13, which is disposed in the valve housing 12 so as to be longitudinally displaceable, but not rotatable. As in the prior art, an orifice 31 is provided in the valve housing for the draining of the hydrant;

this orifice is closed by the seal 30 when the shut-off valve is open. The shut-off valve 13 has a tapered valve seal 14 which is held by the holding means 15 and co-operates with the valve seat 16. The spindle 11 extends downward beyond the distance necessary for the operation of the shut-off valve 13, to the end of the valve housing 12, for example, and there it has a square end which engages in a coupling 17, into the other side of which the wedge-gate valve spindle 24 engages.

The valve housing 12 is mounted on a connecting piece 18, which in turn is fastened onto an adapter 22. The adapter 22 is fastened to the wedge-gate valve housing 23.

The wedge-gate valve spindle 24 is mounted by means of a flange 20 between holding means 35 on connecting piece 18 and holding means 36 of adapter 22. The apertures 19 and 21 are provided as by-passes.

The wedge gate 27 is joined to the wedge-gate valve spindle 24 by a wedge-gate spindle nut 26. The wedge gate has a sealing ring 25 which provides a seal against the sealing surface 28. In the hollow wedge gate there is provided a passageway 33 through which a small flow of water passes, which can escape at the top as indicated by the arrows in FIG. 1. The passageway 33 can, of course, be provided at other points; for example, it can be provided at 33a in FIG. 1.

In the case of an underground hydrant, a catch 29 is also provided for the stand pipe. The drain orifice is protected in conventional designs by a drain guard 32.

When the spindle 11 is turned, the wedge-gate spindle 24 turns with it. If spindle 11 is turned counterclockwise, the shut-off valve 13 rises, and at the same time the wedge-gate valve 27 descends. During these actions water flows until the wedge gate has reached the sealing surface 28. Then only a small amount of water flows through the passage 33. From this flow it can be seen from above that the wedge-gate valve is closed. If the spindle is now turned clockwise, the wedge-gate valve rises and the shut-off valve descends. Water flows in a greater amount until the shut-off valve 13 has reached its seat 16 and the wedge gate valve 27 has assumed its uppermost position, as shown in FIG. 2. The hydrant is now dry. This shows that the wedge-gate valve is open.

If repairs have to be made on the shut-off valve or on other parts of the hydrant, the wedge-gate valve 27 is closed and the top portion is removed, the coupling 17 permitting the spindle parts 11 and 24 to be separated.

What is claimed is:

1. A gate valve comprising:
   a. a valve body for installation of the valve in a main line, having a valve seat,
   b. a gate for opening and closing the main line by respectively engaging and disengaging the gate with the valve seat,
   c. gate valve spindle means for selectively lowering and raising the gate to respectively close and open the main line,
   d. a gate housing disposed above the valve body for receiving the gate when the gate is in the raised position,
   e. a hydrant housing releasably mounted on the gate housing and in fluid communication therewith.
   f. a hydrant shut-off valve disposed in the hydrant housing to control flow through said hydrant housing.
   g. shut-off valve spindle means for opening and closing the shut-off valve,
   h. the shut-off valve spindle means and gate valve spindle means being operatively connected to form a single hydrant spindle means.
   i. the hydrant spindle means operating to simultaneously close the gate valve and open the shut-off valve, and simultaneously open the gate valve and close the shut-off valve, and
   j. a bleed passageway in the gate for communicating one side of the gate with the gate housing with the gate in the closed position, whereby with the gate valve installed in a main line with the bleed passageway communicating with the upstream side of the gate valve, when the gate valve is in the closed position, a small stream will continuously flow into the gate housing indicating that the gate is in the closed position.

2. Hydrant according to claim 1, the connection between the gate valve spindle means and the shut-off valve spindle means being a releasable connection permitting disassembly of the shut-off valve and the gate valve with the gate valve installed in the main line.

3. Hydrant according to claim 2, the hydrant housing comprising:
   a. a lower member mounted on the gate valve housing,
   b. an intermediate member mounted on said lower member,
   c. and an upper member releasably mounted on the intermediate member,
   d. the shut-off valve comprising a shut-off valve seat and a shut-off valve plug,
   e. the shut-off valve plug being disposed in the hydrant housing upper member,
   f. the gate valve spindle means having a collar intermediate the gate and said releasable connection joining the spindle means,
   g. retaining means for the collar for securing the collar and the gate valve spindle means at a fixed elevation,
   h. the retaining means including a lower member secured to the hydrant housing lower member and an upper member secured to the hydrant housing intermediate member, said lower and upper retaining means members cooperating together to effect said securing of the gate valve spindle means at a fixed elevation whereby with the gate valve in the closed position and the upper member of the hydrant housing removed and the gate valve spindle means and shut-off valve spindle means disconnected, the gate valve is secured in the closed position.

* * * * *